United States Patent [19]

Hosono et al.

[11] Patent Number: 4,673,072
[45] Date of Patent: Jun. 16, 1987

[54] 4-WHEEL DRIVE TRANSMISSION CONTROL SYSTEM

[75] Inventors: Chihiro Hosono; Yoichi Hayakawa, both of Anjo; Seitoku Kubo, Toyota; Yutaka Taga, Toyota; Shinya Nakamura, Toyota, all of Japan

[73] Assignees: Aisin-Warner Limited; Toyota Motor Corporation, both of Japan

[21] Appl. No.: 671,467

[22] Filed: Nov. 14, 1984

[30] Foreign Application Priority Data

Nov. 14, 1983 [JP] Japan ................................ 58-214646
Dec. 29, 1983 [JP] Japan ................................ 58-248077

[51] Int. Cl.$^4$ .......................................... B60K 23/08
[52] U.S. Cl. ................................... 192/3.57; 180/247
[58] Field of Search ........................ 192/3.52, 3.57; 180/247, 248, 249, 250

[56] References Cited

U.S. PATENT DOCUMENTS

| | | | |
|---|---|---|---|
| 4,369,671 | 1/1983 | Matsumoto | 180/247 |
| 4,444,073 | 4/1984 | Moroto et al. | 74/665 G |
| 4,458,557 | 7/1984 | Hayakawa | 180/247 |
| 4,480,505 | 11/1984 | Takano et al. | 74/869 |
| 4,481,877 | 11/1984 | Takano et al. | 180/233 |
| 4,484,654 | 11/1984 | Hayakawa | 180/247 |
| 4,485,695 | 12/1984 | Kawamoto et al. | 74/869 |
| 4,503,297 | 3/1985 | Hayakawa et al. | 180/247 |

Primary Examiner—Rodney H. Bonck
Assistant Examiner—David A. Testardi
Attorney, Agent, or Firm—Pahl, Lorusso & Loud

[57] ABSTRACT

A control system for a 4-wheel drive transmission including a main transmission and an auxiliary transmission shiftable by operation of a hydraulic clutch for switching the mode of operation either to 2-wheel drive or 4-wheel drive including a manual changeover valve mechanically connected to a shift lever in a passenger's room of a vehicle for operating the hydraulic clutch according to the mode selected by the shift lever.

2 Claims, 8 Drawing Figures

4-WHEEL DRIVE TRANSMISSION CONTROL SYSTEM

BACKGROUND OF THE INVENTION (i) Field of the Invention

This invention relates to a control system for 4-wheel drive transmissions to be mounted on vehicles.

(ii) Description of the Prior Art

In combination with a vehicular automatic transmission which is composed of a speed change gear system, friction elements for selectively coupling components of the gear system with an input or output shaft or other components or fixing them to stationary members, and a hydraulic control system for controlling flows of an operating fluid to and from hydraulic servos which operate the friction elements, the 4-wheel drive vehicles generally employ a 4-wheel drive transfer unit which puts the transmission either in a 2-wheel drive mode or in a 4-wheel drive mode with a plural number of gear positions (or reduction ratios). The component parts of the transfer unit are held in position for 2-wheel drive or in one of a number of 4-wheel drive positions by selectively engaging friction elements such as clutches and brakes which are operated by hydraulic servos. In this regard, the conventional 4-wheel drive vehicles are generally designed to engage the friction elements selectively by on-off operations of a plural number of solenoid valves which operate spool valves provided in a transfer control system of the 4-wheel drive automatic transfer unit, which spool valves are located between a pressure source and the hydraulic servos of the clutches and brakes for controlling flows of an operating fluid to and from the hydraulic servos in response to manual operation of a button provided besides a driver's seat. Therefore, difficulties are encountered in that the solenoid valves often malfunction due to electric noises and, under certain operating conditions, an erroneous gearshift is likely to occur in the case of the button type control unless it is confirmed with eyes.

SUMMARY OF THE INVENTION

It is an object of the present invention to provide a control system for 4-wheel drive transmissions, which is completely free of malfunctions as caused by electric noises and which permits a driver to make gearshifts securely by feel without necessity for visual observation of the shift controls.

It is another object of the present invention to provide a control system for 4-wheel drive transmissions, employing a short stroke for gear shifts between a 2-wheel drive high speed position and a 4-wheel drive high speed position of the same reduction ratio to guarantee good operationability, and a long stroke for gear shifts between a 4-wheel drive high speed position and a 4-wheel drive low speed position to increase the reliability against misoperation, thereby preventing loss of the maneuvability of the vehicle as well as shocks which would be caused by inadvertent shifts.

According to the present invention, there is provided a control system for a 4-wheel drive transmission including a main transmission and an auxiliary transmission shiftable by operation of a hydraulic clutch for switching the mode of operation either to 2-wheel drive or 4-wheel drive, characterized in that the control system comprises a manual changeover valve mechanically connected to a shift lever in the passenger compartment of a vehicle for operating said hydraulic clutch according to the mode selected by operation of the shift lever.

According to another aspect of the present invention, there is provided a control system for a 4-wheel drive transmission including a main transmission and an auxiliary transmission shiftable by operation of a hydraulic clutch for switching the mode of operation either to 2-wheel drive or 4-wheel drive and capable of establishing first and second gear positions in the 4-wheel drive mode by the use of hydraulic means, characterized in that the control system comprises a manual change-over valve mechanically connected to a shift lever in the passenger compartment of a vehicle for operating the hydraulic clutch and hydraulic means according to the range selected by operation of the shift lever.

According to another aspect of the invention, there is provided a control system for a 4-wheel drive transmission including a manual change-over valve connected to a shift lever in the passenger compartment of a vehicle, a shift valve having a first position for establishing a high speed gear position and a second position for establishing a low speed gear position, a first clutch means for establishing the high speed gear position, a first brake means for establishing the low speed gear position, and a second clutch means for establishing the 4-wheel drive, characterized in that the manual change-over valve comprises a first port in fluid communication with a line pressure circuit, a second port for connecting the second clutch means with the first port, a third port communicable with the first port for urging the shift valve into the first position for establishing the high speed gear position, and a fourth port communicable with the third port for draining oil pressure urging the shift valve toward the high speed gear position.

In a preferred form of the invention, the 4-wheel drive transmission control system is coupled with a vehicular automatic transmission (a main transmission) which is automatically shifted according to operating conditions of the vehicle by a hydraulic control system, and includes a 4-wheel drive transfer unit (an auxiliary transmission) shiftable to one of the positions of 2-wheel drive, high speed 4-wheel drive and low speed 4-wheel drive, the transfer unit including an input shaft, a first output shaft located coaxially and in series to the input shaft, a planetary gear set provided between the input shaft and first output shaft, a clutch C3 for coupling a component part of the planetary gear set with another component part, a brake B4 for engaging a component part of the planetary gear set with a stationary member, a 4-wheel drive sleeve rotatably fitted on the first output shaft, a 4-wheel drive clutch C4 provided between the first output shaft and sleeve, hydraulic servos for operating the respective clutches and brake, a second output shaft disposed parallel with the input shaft, and a transfer mechanism provided between the sleeve and second output shaft. The transfer control mechanism includes a manual valve which is connected to a manual shift lever provided beside the driver's seat of the vehicle, selectively supplying oil pressure from a pressure source to the clutches and brake for automatically effecting shifts to and from 2-wheel drive, low speed 4-wheel drive and high speed 4-wheel drive.

Preferably, the manual change-over valve is arranged to have a larger space between the 4-wheel drive high speed and 4-wheel drive low speed positions than between the 2-wheel drive high speed and 4-wheel drive high speed positions, so that the shift lever has a larger stroke length for a shift between the 4-wheel drive high speed and 4-wheel drive low speed positions than a shift between the 2-wheel drive high speed and 4-wheel drive high speed positions.

The above-described 4-wheel drive transmission control system according to the invention has the following advantages.

Namely, in a control system for a 4-wheel drive transmission having a main transmission and an auxiliary transmission which is shiftable between 2-wheel drive and 4-wheel drive positions by a hydraulic clutch, the switching of the hydraulic clutch is performed by a manual change-over valve which is mechanically connected to a shift lever in the driver's cabin, so that the control system is free of malfunctions due to noises and shifted positions are discernible without visual confirmation.

The manual change-over valve is constructed to have a greater gap space between the 4-wheel drive high speed position and 4-wheel drive low speed position than between the 2-wheel drive high speed position and 4-wheel drive high speed position, so that the shift lever has a larger stroke length for shifts between the 4-wheel drive high speed position and 4-wheel drive low speed position than for shifts between the 2-wheel drive high speed position and 4-wheel drive high speed position. This requires a short stroke for shifts between the 2-wheel drive high speed position and 4-wheel drive high speed position which involve no change in reduction ratio, putting the importance on the operationability, and a longer stroke for shifts between the 4-wheel high speed position and 4-wheel low speed position which entail a change in reduction ratio, thereby improving the reliability against malfunctions and preventing loss of maneuvability by the driver. In addition, the shocks which would result from an inappropriate shift operation can also be prevented.

The above and other objects, features and advantages of the invention will become apparent from the following description and appended claims, taken in conjunction with the accompanying drawings which show by way of example preferred embodiments of the invention.

DESCRIPTION OF PREFERRED EMBODIMENTS

Figure 1A:
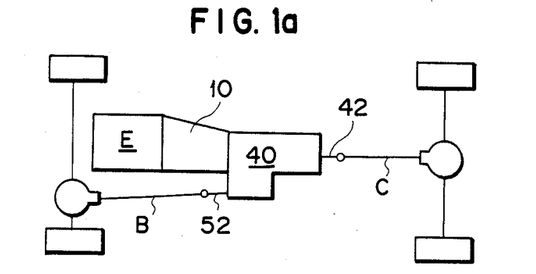
FIGS. 1(a), 1(b), 1(c), and 1(d) are schematic layouts of drive mechanisms for 4-wheel drive vehicles.
Figure 1B:
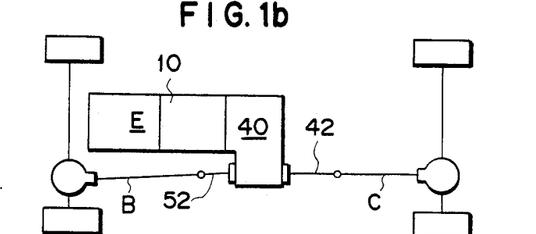
Figure 1C:
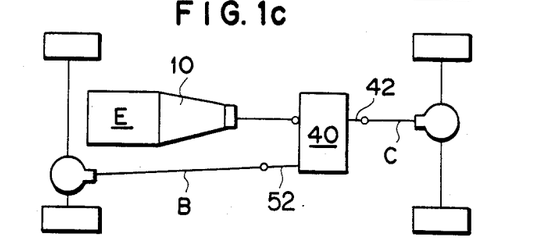
Figure 1D:
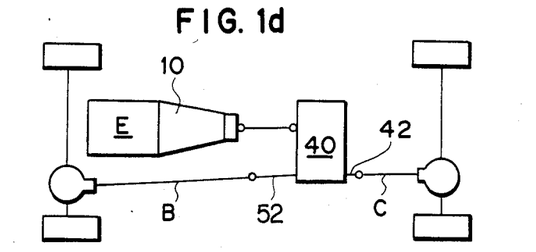
Figure 2:
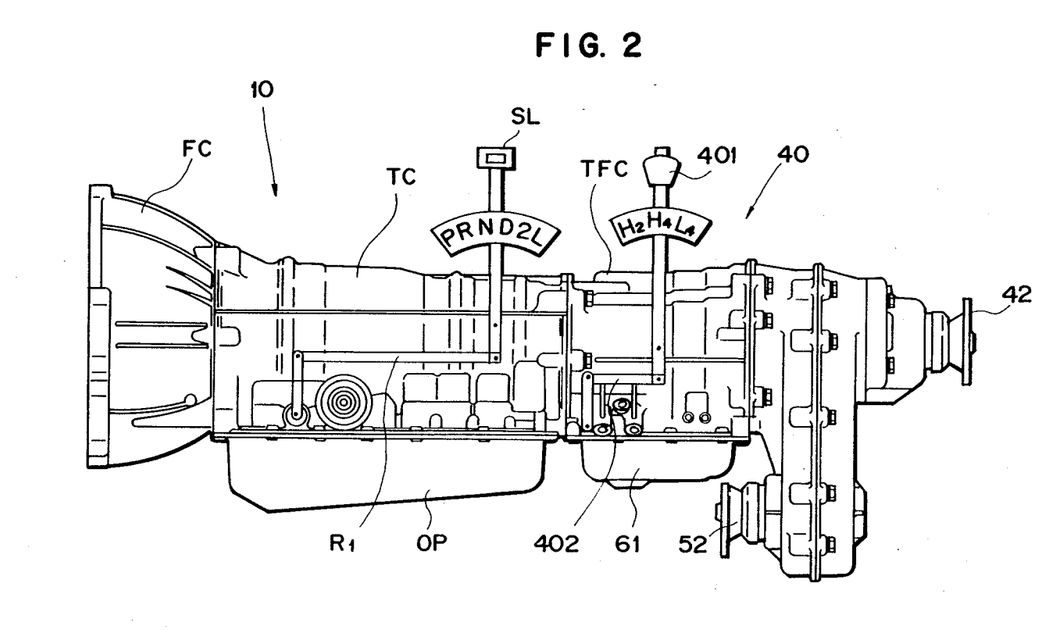
FIG. 2 is a schematic side view of a 4-wheel drive transmission.
Figure 3:
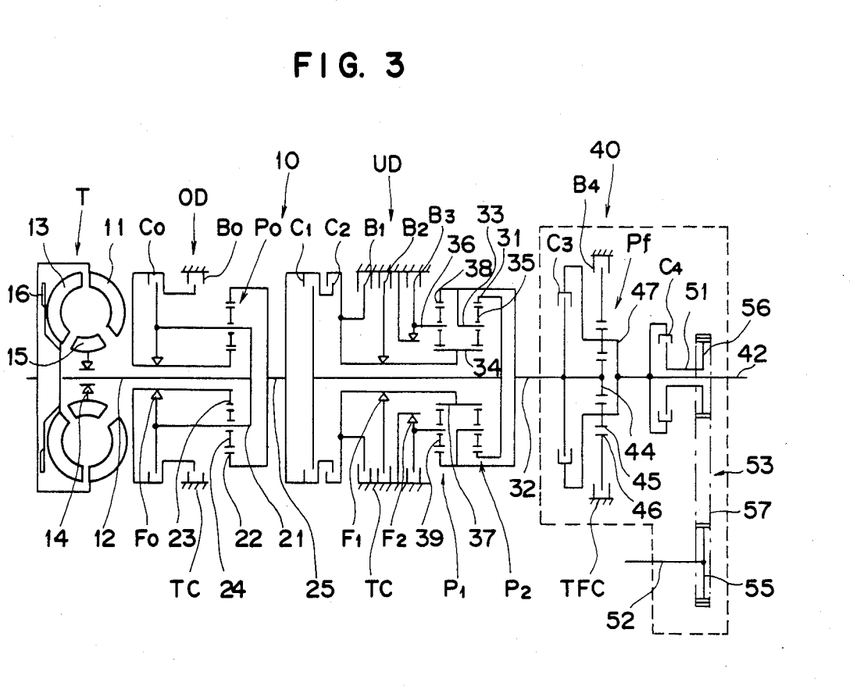
FIG. 3 is a skeletal view of a 4-wheel drive type automatic transmission.

Referring to the accompanying drawings, shown in FIGS. 1(a) to 1(d) are schematic layouts of power of motor vehicles mounting a 4-wheel drive type automatic transmission to be controlled by a 4-wheel drive transmission control system according to the invention. FIGS. 2 and 3 are a schematic side view of an exemplary transmission and a schematic view of its gear train, respectively. In these figures, indicated at 10 is a main transmission which is in this case a four-speed automatic transmission with an overdrive, at 40 an auxiliary transmission consisting of a 4-wheel drive transfer unit coupled to the output shaft of the 4-speed automatic transmission. The 4-wheel drive transfer 40 is assembled with the automatic transmission, which is coupled to an engine E, and has its first output shaft 42 connected to a rear drive propeller shaft C and its second output shaft 52 connected to a front drive propeller shaft B.

The 4-speed drive automatic transmission 10 includes a fluid type torque converter T mounted in a fluid coupling case FC, and an overdrive mechanism OD and an underdrive mechanism UD with three forward speed and one reverse ranges, which are mounted in a transmission case TC. A hydraulic control system which will be described hereinlater is provided in an oil pan OP which is mounted on the underside of the transmission case TC.

The transfer 40 is housed in a transfer unit case TFC, and a transfer control system which will be described hereinlater is provided in an oil pan 61 which is mounted on the underside of the oil pan 61.

The torque converter T includes a pump 11 coupled with the output shaft of the engine, a turbine 13 coupled with the output shaft 12 of the torque converter T, a stator 15 fastened to a stationary part through a one-way clutch 14, and a lock-up clutch 16, the output shaft 12 of the torque converter T serving also as an input shaft of the overdrive mechanism OD.

The overdrive mechanism OD is constituted by a planetary gear set Po the component parts of which are fixed to the transmission case or other stationary parts or coupled with the input or output shaft or other members or released from the stationary or coupling members by selectively engaging friction elements including a multiple-disk clutch Co, a multiple-disk brake Bo and a one-way clutch Fo. The output shaft 12 of the torque converter T also serves as an input shaft (12) of the overdrive mechanism OD.

The planetary gear set Po includes a carrier 21 coupled with the input shaft 12, a ring gear 22 coupled with the output shaft 25 of the overdrive mechanism OD, a sun gear 23 rotatably fitted on the input shaft 12 and fixable to the transmission case through the brake Bo and coupled to the carrier 21 through the clutch Co and the one-way clutch Fo provided parallel with the clutch Co, and planetary pinions 24 rotatably supported by the carrier 21 and meshed with the sun gear 23 and ring gear 22.

The output shaft 25 of the overdrive mechanism OD serves also as an input shaft of the underdrive mechanism UD with three forward and one reverse speed ranges.

The underdrive mechanism UD is constituted by friction elements including multiple disk clutches C1 and C2, multiple disk brakes B1, B2 and B3 one-way clutches F1 and F2, and planetary gear sets P1 and P2.

The rear planetary gear set P2 includes: a ring gear 31 connected to the input shaft 25 through the clutch Cl; a carrier 33 connected to the output shaft 32 of the underdrive mechanism UD; a sun gear 34 coupled to the input shaft 25 through the clutch C2 and fixable to the transmission case through a brake B1, a brake B2 provided in parallel with the brake B1, and a one-way clutch F1 provided in series with the brake B2; and planetary pinions 35 rotatably supported by the carrier 33 and meshed with the sun gear 34 and ring gear 31.

The front planetary gear set P1 includes: a carrier 36 fixable to the transmission case through a brake B3 and a one-way clutch F2 provided in parallel with the brake B3; a sun gear 37 formed integrally with the sun gear 34 of the rear planetary gear set P2; a ring gear 38 connected to the output shaft 32; and planetary pinions 39 rotatably supported by the carrier 36 and meshed with the sun gear 37 and ring gear 38.

Figure 4:
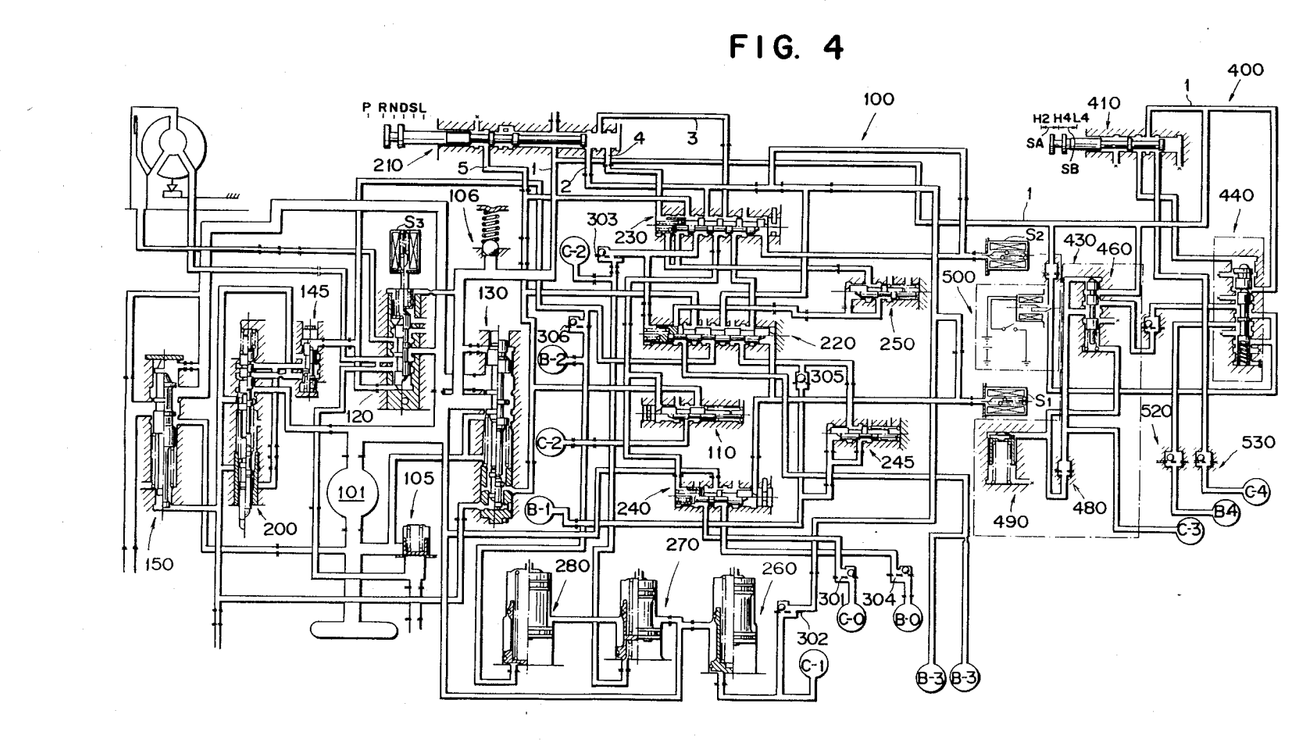
FIG. 4 is a circuit diagram of a hydraulic control system for an automatic 4-wheel drive transfer unit.

The friction elements of this 4-wheel drive transmission, including the above-described clutches and brakes, are selectively engaged and released according to operating conditions of the vehicle such as the extent of the throttle opening of the engine, vehicle speed and the like, by operation of the hydraulic control system 100 is illustrated in FIG. 4, to effect gearshifts to and from four forward speeds including the overdrive (O/D) and a manual shift to and from a reverse position.

The shift lever SL which is provided beside the driver's seat for operating the manual valve of the hydraulic control system has shift positions SP for the ranges of P (parking), R (reverse), N (neutral), D (drive), S (second) and L (low). Table 1 below shows the engaged and released states of the respective clutches and brakes in relation to these shift positions and the fourth speed (4), third speed (3), second speed (2) and first speed (1).

In Table 1, the marks "O" and "X" indicate the engaged and released states of a friction element, while the letters "F" and "L" indicate free rotation and engagement of a one-way clutch, respectively.

TABLE 1

| SP | | Clutches | | | Brakes | | | | OWC | | |
|----|---|----|----|----|----|----|----|----|----|----|----|
|    |   | C0 | C1 | C2 | B0 | B1 | B2 | B3 | F0 | F1 | F2 |
| P  |   | O  | X  | X  | X  | X  | X  | X  |    |    |    |
| R  |   | O  | X  | O  | X  | X  | X  | O  | L  | F  | F  |
| N  |   | O  | X  | X  | X  | X  | X  | X  |    |    |    |
| D  | 1 | O  | O  | X  | X  | X  | X  | X  | L  | F  | L  |
|    | 2 | O  | O  | X  | X  | X  | O  | X  | L  | L  | F  |
|    | 3 | O  | O  | O  | X  | X  | O  | X  | L  | F  | F  |
|    | 4 | X  | O  | O  | O  | X  | O  | X  | F  | F  | F  |
| S  | 1 | O  | O  | X  | X  | X  | X  | X  | L  | F  | L  |
|    | 2 | O  | O  | X  | X  | O  | O  | X  | L  | L  | F  |
|    | 3 | O  | O  | O  | X  | X  | O  | X  | L  | F  | F  |
| L  | 1 | O  | O  | X  | X  | X  | X  | O  | L  | F  | L  |
|    | 2 | O  | O  | X  | X  | O  | O  | X  | L  | L  | F  |

The hydraulic control system 100 for the 4-wheel drive automatic transmission includes: a hydraulic pump 101; a pressure regulator valve 130; a second pressure regulator valve 150; a cooler bypass valve 105; a pressure relief valve 106; a reverse clutch sequence valve 110; a throttle valve 200 which produces a throttle pressure according to the extent of the throttle opening; a cutback valve 145; a lock-up clutch control valve 120; a manual valve 210 constituting a manual switch valve; a 1-2 shift valve 220; a 2-3 shift valve 230; a 3-4 shift valve 240; a solenoid valve S1 which controls the 1-2 and 3-4 shift valves 220 and 240; a solenoid valve S2 which controls the 2-3 shift valve 230; a solenoid valve S3 which controls the lock-up clutch 120; an intermediate modulator valve 245 which regulatres the oil pressure to be fed to the brake B1; a low coast modulator valve 250 which regulates the oil pressure to be fed to the brake B3; accumulator 260 for the clutch C1; an accumulator 270 for the clutch C2; an accumulator 280 for the brake B2; flow control valves 301 to 306 with check valves, which control the flow rates of the oil pressure to be fed to the hydraulic servos of the clutches C0, C1 and C2 and brakes B0, B1 and B2, respectively; and oil conduits which communicate hydraulic servos B-0 to B-3 and C-0 to C-2 of the brakes B0 to B3 and clutches C0 to C2 with the respective valves and hydraulic cylinders of the clutches and brakes. The solenoid valves S1 to S3 are turned on and off by an electronic control system which is not shown, according to vehicle operating conditions such as vehicle speed and engine load, thereby to control the 1-2 shift valve, 2-3 shift valve, 3-4 shift valve and lock-up clutch control valve. These shift valves selectively communicate the hydraulic servos of the clutches and brakes with an oil pressure source according to the position of the manual valve.

The manual valve 210 is mechanically connected to a shift lever SL which is provided beside the driver's seat in the passenger's compartment of a vehicle, through a link mechanism R1 (see FIG. 2), and shiftable to the positions of P (parking), R (reverse), N (neutral), D (drive), S (second) and L (low) according to the range which is manually selected by the shift lever. Table 2 below shows connected and disconnected states of the conduits 2 to 5 with the conduit 1 in the respective positions of the shift lever, in which the marks "O" and "X" indicate the presence or absence of the line pressure, respectively.

TABLE 2

|           | P | R | N | D | S | L |
|-----------|---|---|---|---|---|---|
| Conduit 2 | X | X | X | O | O | O |
| Conduit 3 | X | X | X | X | O | O |
| Conduit 4 | X | X | X | X | X | O |
| Conduit 5 | X | O | X | X | X | X |

The transfer unit 40 of FIG. 3 includes: clutch C3, brake B4 and clutch C4 which serve as friction elements; an input shaft integral with the output shaft 32 of the planetary gear sets P1 and P2; a first output shaft 42 connected in series with the input shaft (32); a planetary gear set Pf interposed between the input shaft (32) and the first output shaft 42; a 4-wheel drive sleeve 51 rotatably fitted on the first output shaft 42; a second output shaft 52 disposed parallel with the input shaft and extended in a direction opposite to the first output shaft; and a transfer mechanism 53 provided between the sleeve 51 and the second output shaft 52. The planetary gear set Pf includes: a sun gear 44 splined on an end portion of the input shaft (32); planetary pinions 45 meshed with the sun gear 44; ring gear 46 meshed with the planetary pinions 45; and a carrier 47 rotatably retaining the planetary pinions 45 and coupled with the fore end of the first output shaft 42. In the particular embodiment shown in FIG. 5, the brake B4 consists of a multiple disk type friction brake which engages the ring gear 46 with the transfer case TC, and is operated by a hydraulic servo B-4 which is constituted by a cylinder 49 formed in the transfer case TFC and a piston 49P fitted in the cylinder 49. The clutch C3 of the planetary gear set Pf is located on the side of the automatic transmission 10 to couple and uncouple the sun gear 44 and carrier 47, and is operated by a hydraulic servo C-3 which is constituted by a cylinder 50 connected to the carrier 47 and a piston 50P fitted in the cylinder 50. The clutch C4 consists of a multiple disk friction clutch which couples and uncouples the first output shaft 42 connected to the carrier 47 and the sleeve 51 connected to one sprocket 56 of the transfer mechanism 53 which drives the second output shaft 52 of the transfer unit.

Figure 5:
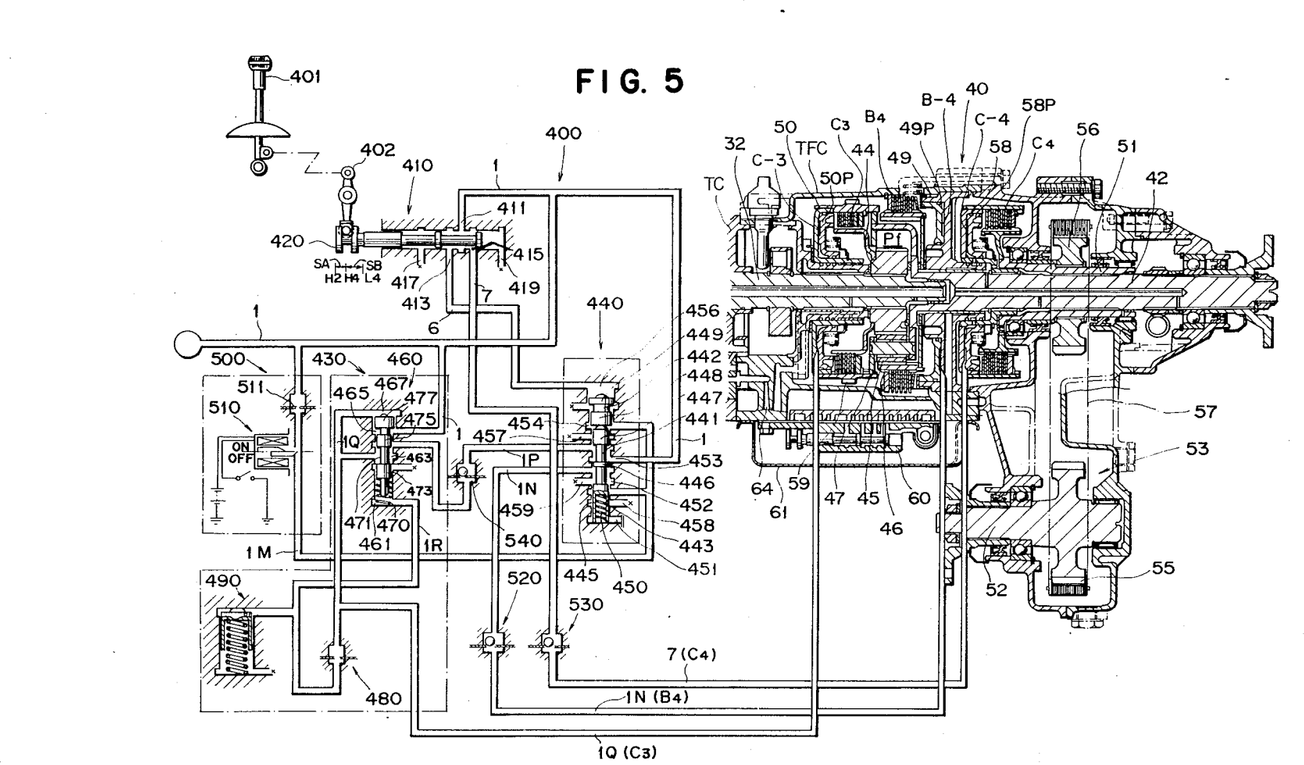
FIG. 5 is a schematic sectional view of the 4-wheel drive transfer unit and a circuit diagram of a hydraulic 4-wheel drive transfer control system according to the invention.

The clutch C4 is operated by a hydraulic servo C-4 which is constituted by a cylinder 58 rotatably supported by the transfer case TFC and a piston 58P fitted in the cylinder 58. The transfer mechanism 53 includes a sprocket 56 splined to the sleeve 51, a sprocket 55 formed on the second output shaft 52 and a chain 57 passed around the sprockets 55 and 56.

A parking gear 59 is provided on the outer periphery of the hydraulic cylinder 50 of the servo C-3, which is engaged by a stopper to lock the first output shaft 42 when the shift lever of the automatic transmission is set in the parking position.

Designated at 60 is a valve casing containing a hydraulic control system which controls the flow of oil pressure to and from the hydraulic servos C-3, C-4 and B-4 of the clutches C3 and C4 and brake B4 of the 4-wheel drive transfer unit 40, and at 61 is an oil pan therefor. The oil pressure to be fed to the hydraulic servos C-3, C-4 and B-4 of the clutches C3 and C4 and brake B4 is led through a conduit 64 formed in the transmission case TC and transfer case TFC to the transfer valve casing 60 which is provided with a transfer control system 400.

In ordinary cruising operation, the line pressure which is supplied to the hydraulic control system of the automatic transmission is fed to the hydraulic servo C3 to engage the clutch C3, while the hydraulic servos B-4 and C-4 are drained to release the brake B4 and clutch C4. Consequently, the sun gear 44 and carrier 47 of the planetary gear set Pf are coupled with each other to transmit power from the input shaft 32 to the first output shaft 42 for the rear wheels in a reduction ratio of 1, operating the vehicle in 2-wheel rear drive mode. At this time, the power from the input shaft 32 is transmitted from the carrier 47 to the first output shaft 42 through the clutch C3, bypassing the sun gear 44, planetary pinions 45 and ring gear 46, so that no load is applied on the tooth faces of these gears, prolonging their service life. When it becomes necessary to switch the operation from 2-wheel drive to 4-wheel drive, the shift lever 401 which is provided beside the driver's seat is manually shifted, whereupon the line pressure is gradually supplied to the hydraulic servo C-4 of the transfer control system 400 to engage the clutch C4 smoothly. As a result, the power is also transmitted to the front wheels through the transfer mechanism 53, second output shaft 52 and propeller shaft B (shown in FIG. 1), putting the transmission in 4-wheel drive lock-up state (high speed 4-wheel drive) in which the power is transmitted from the input shaft 32 at a reduction ratio of 1 to both of the first and second output shafts 42 and 52 which drive the rear and front wheels, respectively. If there arises a necessity for increasing the output torque during the 4-wheel drive operation, for example, for climbing a steep slope, the shift lever 401 is manually shifted, whereupon the oil pressure to the hydraulic servo is applied to the inhibitor valve 440 which switches the operation between high speed 4-wheel drive and low speed 4-wheel drive gradually supplying the line pressure to the hydraulic servo B-4 and at the same time draining the hydraulic servo C-3 in a suitable timing sequence to engage the brake B4 gradually and release the clutch C3. As a consequence, the sun gear 44 and carrier 47 are released and the ring gear 46 is held stationary, so that the power from the input shaft 32 is transmitted to the first and second output shafts 42 and 52 after a reduction through the sun gear 44, planetary pinion 45 and carrier 47, putting the transmission in 4-wheel drive low speed operation (low speed 4-wheel drive) of a larger torque. Table 3 below shows the various ranges which are selectable by the manual shift of the transfer unit in relation with the engagement and release of the brake B4 and clutches C3 and C4 and the modes of the vehicle operation.

TABLE 3

| Manual shift operation | | Friction element | | | |
|---|---|---|---|---|---|
| Selected range | | C3 | B4 | C4 | Reduction ratio |
| H2 | lock-up 2-W drive | O | X | X | 1 |
| H4 | Lock-up 4-W drive | O | X | O | 1 |
| L4 | Lock-up 4-W drive | O | X | O | 1 |
| L4 | Reduced 4-W drive | X | O | O | 3.0 |

In Table 3, the marks "O" and "X" indicate engaged and released states of the friction elements, respectively. The reduction ratio (of 3.0) was calculated according to an equation of reduction ratio $=(1+\lambda)/\lambda=3.0$ in which the gear ratio $\lambda$ of the sun gear 44 to the ring gear 46 of the planetary gear set was 0.5.

In the embodiment of FIGS. 4 and 5 the transfer control system 400 of the 4-wheel drive transfer includes: a transfer manual valve 410 connected to the shift lever 401 at the driver's seat through a link mechanism 402; an inhibitor valve 440 for switching operation between high speed (lock-up) and low speed (reduction) in the 4-wheel drive mode; an upshift (L4 H4 shift) timing mechanism 430 provided between the inhibitor valve 440 and the hydraulic servo C-3 and constituted by an accumulator control valve 460, an accumulator 490 and a throttle 480; an automatic transfer control mechanism 500 having a throttle 511 in conduit 1M in communication with the conduit 1 and an electromagnetic solenoid valve 510 provided on the downstream side of the throttle, and controlling the input oil pressure of the inhibitor valve 440. according to the output of a vehicle speed sensor (not shown) to switch the operation automatically between high speed and low speed in the 4-wheel drive mode; a throttle 520 with a check valve, provided in conduit 1N conducting the operating oil to and from the hydraulic servo B-4; a throttle 530 with a check valve, provided in conduit 7 conducting the operating oil to and from the hydraulic servo C-4; and a throttle 540 with a check valve, provided in conduit 1P intercommunicating the inhibitor valve 440 and upshift timing mechanism 430.

The transfer manual valve 410 is provided with a spool 420 which is connected to the shift lever 401 at the driver's seat through the link mechanism 402, an inlet port 411 in communication with the line pressure in conduit 1 of the hydraulic control circuit of the 4-wheel drive automatic transmission, an outlet port 413 in communication with conduit 6, and outlet port 415 in communication with conduit 7, and drain ports 417 and 419. When the spool 420 is set in the 2-wheel drive (H2) position, the transfer manual valve 410 communicates conduit 1 with conduit 6 while communicating conduit 7 with the drain port 419. When set in the 4-wheel drive (H4) position, it communicates conduit 1 with conduits 6 and 7, and in the low speed 4-wheel drive (L4) position, it communicates conduit 1 with conduit 7, communicating conduit 6 with the drain port 417.

The transfer manual valve 410 has a stroke length SA between H2 and H4 positions and a stroke length SB between H4 and L4 positions such that SA<SB.

The inhibitor valve 440 includes a spool 441 which is loaded with a spring 450 at the lower end in the drawing, and a plunger 442 located in series with the spool 441. The spool 441 is provided with lands of the same diameter, namely, a sleeve-like land 445 at the lower end loaded with the spring 450, an upper land 447 and an intermediate land 446. The plunger 442 is provided with a lower land 448 which is larger in diameter than the lands of the spool 441, and with an upper land 449 of a larger diameter than the lower land 448. Spool 441 and plunger 442 define a lower oil chamber 451, first and second intermediate oil chambers 452 and 453 between the intermediate land 446 and the sleeve-like land 445 or the upper land 447, an oil chamber 454 between the spool 441 and the plunger 442, and an upper oil chamber 456.

When the spool 441 is in the upper position, the lower oil chamber 451 of the inhibitor valve 440 is in communication with a vehicle speed pressure conduit 1M through a port 443 in the sleeve-like land, the first intermediate oil chamber 452 communicates the line pressure conduit 1 with a reducing conduit 1N, the second oil intermediate oil chamber 453 communicates a lock-up conduit 1P with the drain port 457. When the spool 441 is in the lower position shown in the drawing, the lower oil chamber 451 communicates with the drain port 458 through port 443 in the sleeve-like land, the first intermediate oil chamber 452 communicates the reducing conduit 1N with the drain port 459, and the second intermediate oil chamber 453 communicates the line pressure conduit 1 with the lock-up conduit 1P. Further, the oil chamber 454 is constantly communicated with the vehicle speed pressure conduit 1M, while the upper oil chamber 456 is constantly communicated with the conduit 6.

The accumulator control valve 460 includes a spool 471 with a biasing spring 470 loaded against the lower end in the drawing. The spool 471 is provided with a lower land 473, an intermediate land 475 and an upper land 477 which is larger than the lower and intermediate lands in diameter by predetermined dimensions, defining a lower oil chamber 461, intermediate oil chambers 463 and 465, and an upper oil chamber 467 from the lower side in the drawing.

The lower intermediate oil chamber 463 of the accumulator control valve 460 is constantly communicated with conduit 1Q leading to the hydraulic servo C-3, the upper intermediate oil chamber 465 is constantly communicated with the line pressure conduit 1, the upper oil chamber 467 is fed back with the oil pressure in the conduit 1Q, the lower oil chamber 461 is supplied with oil pressure through the throttle 480 and accumulator 490 from the conduit 1R which is in communication with the conduit 1Q.

With regard to the automatic transfer control mechanism 500, the solenoid valve 510 is turned on by the output signal of an electronic control system (not shown) which receives a signal from a vehicle speed sensor when the vehicle speed is lower than a predetermined value (e.g., 20 km/h), draining the conduit 1M to turn the input oil pressure of the inhibitor valve 440 to a low level. When the vehicle speed is higher than a predetermined value (e.g., 20 km/h), the solenoid valve 510 is turned off by the output of the electronic control system to hold in the conduit 1M an oil pressure of a high level (equivalent to the line pressure).

The line pressure is fed from conduit 1 to the oil chamber 465, and conduit 7 is connected to the hydraulic servo C-4 through the throttle 530.

The operations of the transfer in the respective operational ranges are as follows.

(a) The conduit 7 is drained when the transfer manual valve is set in the H2 range position, so that no power is transmitted to the sleeve 51 to maintain the transmission in 2-wheel drive mode. Further, the line pressure is supplied to the conduit 6 to hold the spool 441 and plunger 442 of the inhibitor valve 440 in the respective lower positions in the drawing, draining the conduit 1N by communication with the drain port 459. Consequently the brake B4 and clutch C4 are released. The conduit 1P in communication with conduit 1 is communicated with conduit 1Q through the throttle 540 with a check valve and accumulator control valve 460 to engage the clutch C3. Accordingly, the transfer unit 40 is held in the H2 (2-wheel drive in lock-up state).

(b) When the transfer manual valve is set in the H4 range position, the line pressure is supplied to both of conduits 6 and 7. The line pressure supplied to conduit 6 holds the spool 441 and plunger 442 of the inhibitor valve 440 in the lower positions in the drawing, and the line pressure to conduit 7 engages the clutch C4. As a result, the transfer 40 is held in the H4 (4-wheel drive in lock-up state) position.

(c) When the manual transfer valve is set in L4 position, the conduit 6 is drained and the line pressure is supplied to conduit 7. Therefore, the clutch C4 is engaged to maintain the 4-wheel drive.

When the manual transfer valve is set in L4 range during operation at a vehicle speed which is higher than a predetermined value and at which the solenoid valve 510 is off, the line pressure is supplied to conduit 1M. Accordingly, the spool 441 of the inhibitor valve 440 is continuedly held in the lower position of the drawing by the line pressure which is applied to the oil chamber 454, without making a gearshift to prevent overrunning of the engine.

When the manual transfer valve is set in L4 range at a vehicle speed which is lower than a predetermined value and at which the solenoid valve 510 is on, or when the vehicle speed drops below a predetermined value during operation in L4 range and the solenoid valve 510 is turned on, conduit 1M is drained and as a result the spool 441 is held in the upper position of the drawing by the action of the spring 450, communicating conduit 1 with conduit 1N to supply the operating oil to the hydraulic servo B-4 and draining conduit 1P through the drain port 457 to drain the hydraulic servo of the clutch C-3. Consequently, the transfer is held in low speed 4-wheel drive. Even if the vehicle speed becomes higher than a predetermined value and the solenoid valve 510 is turned on after the transfer is once set in low speed 4-wheel drive, the line pressure of conduit 1M is applied to the oil chamber 454 of the inhibitor valve 440 and at the same time to the lower oil chamber 451 through the oil port 443 of the sleeve-like land 445. Accordingly, the spool 441 is continuedly held in the same position to maintain low speed 4-wheel drive.

The ratio of the afore-mentioned stroke lengths of the transfer manual valve 410 is preferred to be in the range of 1.2 to 2.0 since a ratio smaller than 1.2 would lead to misoperations while a ratio greater than 2.0 would deteriorate operationability. More preferably, the stroke length ratio is preferred to be in the range of 1.4 to 1.7.

The transfer manual valve which is employed as a manual change-over valve in the foregoing embodiment may be replaced by a spool valve or a valve of a different type.

What is claimed is:

1. A control system for a 4-wheel drive transmission including a transfer unit capable of establishing 2-wheel drive mode and 4-wheel drive mode by operation of first hydraulic means and capable of establishing low-speed and high-speed gear positions in said 4-wheel drive mode by operation of second and third hydraulic means, said control system comprising:

a source of oil at line pressure;

a manual valve having:
- an inlet port connected to said line pressure source,
- a first outlet port,
- a second outlet port for supplying said line pressure directly to said first hydraulic means,
- a first drain port,
- a second drain port, and
- a spool mechanically connected to a shift lever and shiftable between first, second and third positions;
- said inlet port being in fluid communication with said first outlet port and said second outlet port being in fluid communication with said second drain port when said spool is in said first position,
- said inlet port being in fluid communication with said first and second outlet ports when said spool is in said second position,
- said inlet port being in fluid communication with said second outlet port and said first outlet port being in fluid communication with said first drain port when said spool is in said third position;

an automatic transfer control mechanism for supplying oil at a control pressure which varies according to vehicle speed;

an inhibitor valve having:
- a first chamber connected to said first outlet port,
- a second chamber connected to receive control pressure from said automatic transfer control mechanism, and
- a spool shiftable between a high-speed position and a low-speed position to selectively connect said oil pressure source and said second or third hydraulic means, said spool being held in said high-speed position when said line pressure is supplied to said first chamber through said manual valve or when said control pressure supplied to said second chamber is above a predetermined level, and said spool being held in the low-speed position when said line pressure is drained from said first chamber and the oil pressure supplied to said second chamber is below a predetermined level.

2. A control system for a 4-wheel drive transmission as set forth in claim 1, wherein said manual valve has a larger stroke length for shifting between said second and third positions than for shifting between said first and second positions.

* * * * *